United States Patent [19]

Khoe et al.

[11] Patent Number: 5,688,378
[45] Date of Patent: Nov. 18, 1997

[54] PHOTOASSISTED OXIDATION OF SPECIES IN SOLUTION

[75] Inventors: Ging Hauw Khoe, Cronulla; Maree Therese Emett, Pennant Hills; Robert G. Robins, Lindfield, all of Australia

[73] Assignee: CRC for Waste Management & Pollution Control, Australia

[21] Appl. No.: 633,810
[22] PCT Filed: Oct. 24, 1994
[86] PCT No.: PCT/AU94/00649
§ 371 Date: Apr. 22, 1996
§ 102(e) Date: Apr. 22, 1996
[87] PCT Pub. No.: WO95/11195
PCT Pub. Date: Apr. 27, 1995

[30] Foreign Application Priority Data

Oct. 22, 1993 [AU] Australia .................. PM1969

[51] Int. Cl.$^6$ .................. B01D 11/00; C02F 1/68; A62D 3/00
[52] U.S. Cl. .................. 204/157.4; 204/157.44; 204/158.2; 423/150.3; 423/87; 423/304; 210/763; 210/758; 210/906; 210/912; 588/237; 588/247
[58] Field of Search .................. 210/912, 758, 210/759, 760, 763, 722, 748; 423/140, 87, 322, 150.1, 150.3, 713, 304; 204/157.44, 157.15, 157.4, 157.45, 157.5, 157.51, 158.2; 588/237, 247

[56] References Cited

U.S. PATENT DOCUMENTS 3,819,516  6/1974  Murchison et al. .................. 210/63

FOREIGN PATENT DOCUMENTS 292893  8/1991  German Dem. Rep. .

OTHER PUBLICATIONS

WPIDS abstract of DD 292893 (Mock et al.), Aug. 14, 1991.

*Primary Examiner*—T. Tung
*Assistant Examiner*—Alex Noguerda
*Attorney, Agent, or Firm*—Ostrolenk, Faber, Gerb & Soffen, LLP

[57] ABSTRACT

The invention relates to methods and processes for the photoassisted oxidation of dissolved species such as arsenic, iron, phosphorous and sulphur. Each aspect of the invention involves supplying to a solution including the species to be oxidized, an oxidant and a photoabsorber, and then irradiating the resultant solution with UV/electromagnetic radiation. The resulting oxidised species can then be subsequently treated, used and/or removed (e.g. through precipation/co-precipitation).

21 Claims, 9 Drawing Sheets

PHOTOASSISTED OXIDATION OF SPECIES IN SOLUTION

This is a national stage application of PCT/AU94/00649, filed Oct. 24, 1994.

TECHNICAL FIELD

The present invention relates to methods and processes for the photoassisted oxidation of dissolved species including arsenic, iron, phosphorus and sulphur. Particularly, though not exclusively, the invention relates to the treatment of process liquors, waters and waste waters, for example, liquors generated by industries such as the mineral processing and chemical industries and as found in ground waters, in geothermal waters, in leachates from coal fly ash piles, and in acid drainage arising from pyritic heaps resulting from the past practices employed in mining metallic ores, etc.

BACKGROUND ART

Within the above-mentioned industries, there are many impurity bearing aqueous streams. For example streams containing arsenic in the trivalent (+3) oxidation state are found. Known methods of arsenic removal from arsenic-bearing waters include adsorption processes using metal-hydroxide co-precipitation or ion-exchange media, and arsenic precipitation as ferric- or calcium-compounds. When arsenic is in the dissolved state, it is most efficiently removed from aqueous solutions by the above methods when it is present in the pentavalent (arsenate) form. Consequently, there is a need to convert arsenic(III) to arsenic(V) in order to achieve effective arsenic removal from solution. Furthermore, trivalent (arsenite) compounds have been reported to be fifty times more toxic than the corresponding pentavalent arsenate forms. (In this specification, and in accordance with the IUPAC convention, reference to the terms "arsenic(III)" or "As(III)" will include all arsenite species in which the arsenic is present in the trivalent oxidation state, and reference to the terms "arsenic(V)" or "As(V)" will include all arsenate species in which the arsenic is present in the pentavalent oxidation state. Similar reasoning applies to the oxidation states for all other species disclosed.)

Arsenic(III) compounds in solution can be oxidised to arsenic(V) by dissolved oxygen in ambient conditions only at an extremely slow rate. Hence, stronger oxidants such as chlorine, hydrogen peroxide, and ozone are usually used to convert arsenic(III) to arsenic(V) as part of the arsenic-removal process. In many cases these oxidants represent the major cost item of the water treatment process.

Furthermore, many of the published methods for the oxidation of arsenic(III) to arsenic(V) have been complex, costly or inappropriate for application on a large or industrial scale. Many of the reagents used in the oxidation treatment are expensive, as are some of the sources of ionising radiation. Alternatively, the conversion of arsenic(III) to arsenic(V) has not been sufficiently fast enough. Other complexities include the need for special equipment due to operating parameters such as high pressure, and elevated temperature, the use of electrolysis techniques etc. Clearly, it would be advantageous if a cheaper means was provided for oxidizing arsenic using a method which can be used at room temperature and low pressure without the need for special equipment and complex operation.

DESCRIPTION OF THE INVENTION

In a first aspect, the present invention provides a method for the oxidation of As(III) in solution comprising the steps of:

(a) supplying to the solution oxygen, and a photoabsorber which is capable of increasing the rate of As(III) oxidation when exposed to UV radiation; and (b) irradiating the resulting solution from (a) with UV radiation.

Preferably the photoabsorber is a metal-containing dissolved or solid species, which in one form of the invention can be a dissolved cation species.

The wavelength(s) of the UV radiation are typically selected such that during irradiation the photoabsorber causes a chemical reaction that increases the rate of oxidation of As(III) by the oxidant relative to a rate where the photoabsorber is absent from the solution. The UV radiation can be sourced eg. from all types of mercury lamps and from sunlight.

Preferably the oxidation is that of As(III) to As(V).

At least preferred forms of the first aspect of the present invention can provide a photoassisted (or photo-enhanced) oxidation process which may enable the more expensive oxidation processes to be replaced by a simple procedure which can be operated at ambient conditions. Thus, expensive chemicals such as hydrogen peroxide, chlorine and ozone may not be required and the process can be used to oxidise, for example, arsenic(III) species in industrial waste waters, processes liquors, leachates, dissolved arsenic trioxide from flue dust, and arsenic bearing ground water intended for municipal water supply. The process can also be used for the treatment of geo-thermal/spring waters which often contain arsenic(III) species in solution.

The photoabsorber can be a photo catalyst such as a dissolved species or a solid which absorbs light.

Changes in the oxidation state of the photoabsorber may be acceptable in some applications. Preferably the photoabsorber is iron(II) and/or iron(III) species, but in addition or independently can also be Cu(II). The oxygen can be supplied as pure oxygen or air. Both can be used at pressures grater than 1 atmosphere.

As indicated above, when arsenic(III) is oxidised to arsenic(V), it is considerably easier to remove arsenic from solution. Preferred methods are precipitation and adsorption processes.

In a second aspect the present invention provides a process for removal of As(III) from solution comprising the steps of:

(a) supplying to the solution an oxidant, and a photoabsorber which is capable of both increasing the rate of As(III) oxidation when exposed to electromagnetic radiation and precipitating/co-precipitating with subsequently oxidized As(III);

(b) irradiating the resulting solution from (a) with electromagnetic radiation; and (c) allowing precipitation/co-precipitation of the subsequently oxidized As(III) and the photoabsorber, if necessary, by adjusting the pH of the solution from (b) to cause said precipitation/co-precipitation.

Typically the wavelength(s) of the electromagnetic radiation are selected such that during irradiation the photoabsorber causes a chemical reaction that increases the rate of oxidation of As(III) by the oxidant relative to a rate where the photoabsorber is absent from the solution.

Preferably, in step (c) and if necessary, the pH is adjusted to be greater than about 3.

Preferably the photoabsorber is one or both of Fe(III) or Fe(III).

Preferably, in step (c) and if necessary, the pH is adjusted by adding lime, solution hydroxide or other base to the solution.

Electromagnetic radiation of wavelengths in the UV and/or visible light bands is preferably used in the second aspect, although it is most preferred that UV radiation is used. In both the first and second aspects a low, medium or high pressure mercury arc lamp can be used as the source of UV radiation. As an alternative, UV radiation from a laser source can be used. The process of the second aspect also enables the use of sunlight as a source of electromagnetic radiation.

In the second aspect, it is preferred that the oxidant is oxygen, which can be supplied as pure oxygen or air.

When irradiating arsenic(III) in the presence of eg. dissolved oxygen and Fe(II)/Fe(III), radiation including specific radiant energy at wavelengths or about 254 nm and/or 190 nm is preferably used, although for the second aspect other wavelengths extending into the visible region of the solar spectrum may also be used.

The electromagnetic radiation can be supplied continuously or in pulses. In some embodiments, a continuous supply should be used because the oxidation reaction stops or slows when the electromagnetic irradiation is stopped whereas a pulse supply is preferably used when the oxidation reaction continues or accelerates for a period after the electromagnetic irradiation is stopped.

When dissolved iron species are used as the photoabsorber, a preferred operating pH for arsenic oxidation in the first and second aspects is a pH of less than 4. At low pH, the iron can be present in solution in its di- and tri-valent states.

If the oxidation reaction pH is above 4, then Fe(II) is not stable and is itself oxidized to insoluble ferrihydrite. The oxidation of As(III) still continues, but not as efficiently.

Alternatively, other iron hydroxy oxide compounds, magnetic iron oxide or magnetic iron oxide coated with catalytic compound can be used as the photoabsorber at different pH values.

Iron(III) is often used as an oxidant in hydrometallurgical processes, eg. the heap leaching of pyritic ores and the acid leaching of uranium ores. Since the rate of oxidation of iron(II) to iron(III) by, for example, dissolved oxygen in a low pH (acid) solution is very slow, oxidants such as peroxide, hypochlorite and other oxychloride species have been used. However, these species have attendant handling and environmental problems (eg. in disposal, storage etc) and are often costly.

In a third aspect the present invention provides a method for oxidising Fe(II) to Fe(III) in a solution having acid pH comprising the steps of:

(a) supplying to the solution an oxidant, and a substance which is different to Fe(II) and which is both capable of being oxidised and increasing the rate of reaction of Fe(II) to Fe(III) when subject to UV radiation, relative to a rate in which the substance is absent from the solution; and (b) irradiating the resulting solution from (a) with UV radiation.

Most preferably the pH of the solution is about 3.5 or less.

Preferably the substance is As(III) or P(III). By using such a substance, the oxidation of Fe(II) to Fe(III) is cheaper than existing techniques. The wavelengths of UV radiation used can be selected as appropriate for the substance supplied.

When the substance is P(III), it is preferred that P(III) is oxidised to P(V) so that the Fe(III) is then precipitated as a ferric phosphate.

It is most preferred that the oxidant includes oxygen, which can be supplied as pure oxygen or air.

As indicated above, the method of the first aspect includes the steps of arsenic(III) oxidation in the presence of oxygen, a photoabsorber and UV radiation.

Analogously, in a fourth aspect the present invention provides a method for the oxidation of phosphorus (III) and in solution comprising the steps of:

(a) supplying to the solution oxygen, and a photoabsorber which is capable of increasing the rate of said oxidation; and (b) irradiating the resulting solution from (a) with UV radiation.

The method of the fourth aspect has many of the advantages associated with the first aspect of the invention.

The wavelength(s) of the UV radiation are typically selected such that during irradiation the photoabsorber causes a chemical reaction that increases the rate of said oxidation by oxygen relative to a rate in which the photoabsorber is absent from the solution.

The photoabsorber can be one or more of iron(II), iron (III), or Cu(II), as appropriate. The UV radiation wavelengths can be selected as for the first aspect. It is also preferred that the oxygen is supplied as either pure oxygen or air.

BRIEF DESCRIPTION OF THE DRAWINGS

Notwithstanding any other forms which may fall within the scope of the present invention, preferred embodiments of the invention will now be described, with reference to the following examples. It should be appreciated, however, that the invention is not limited to the Examples or Figures in which.

Figure 5:
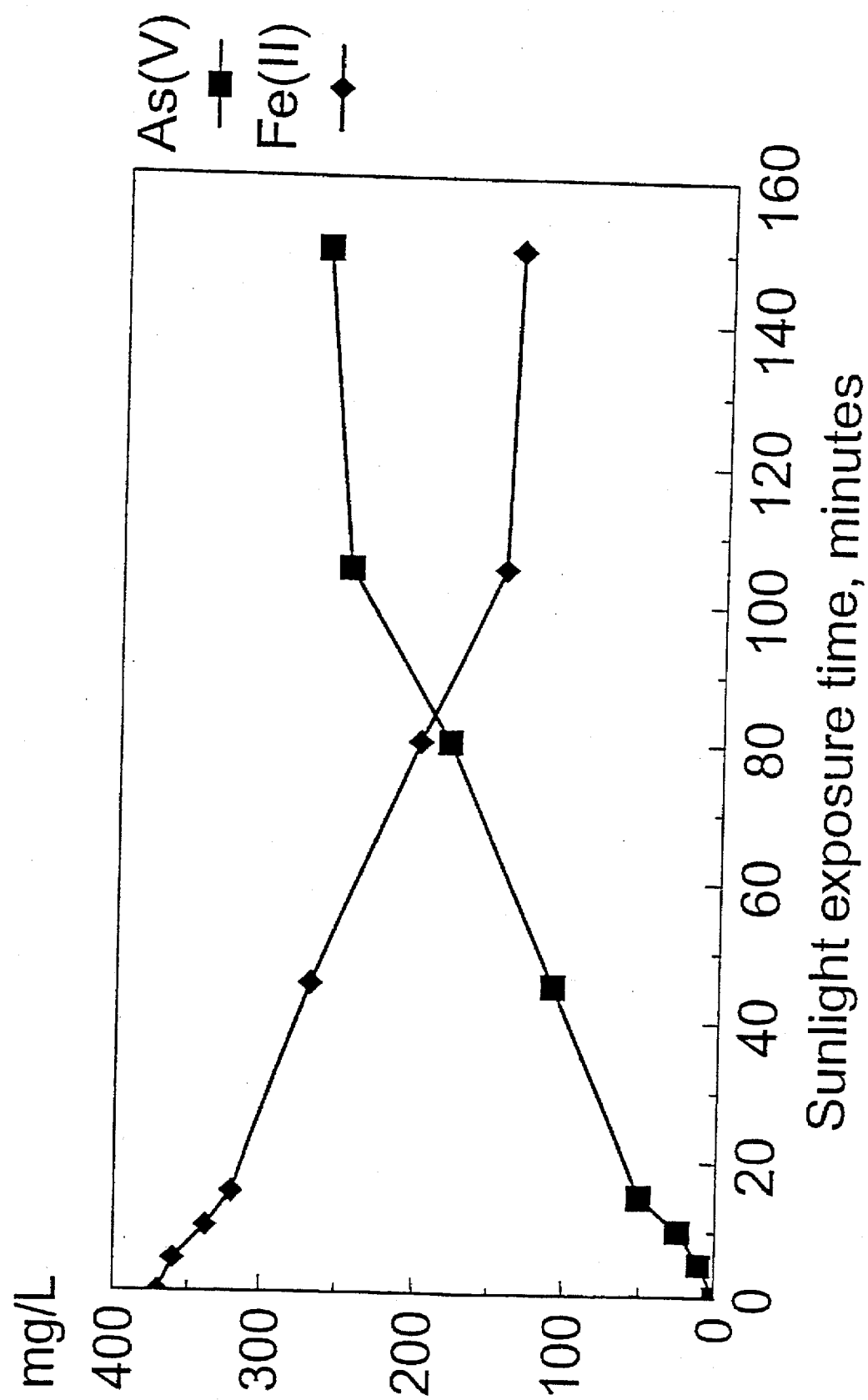
Figure 6:
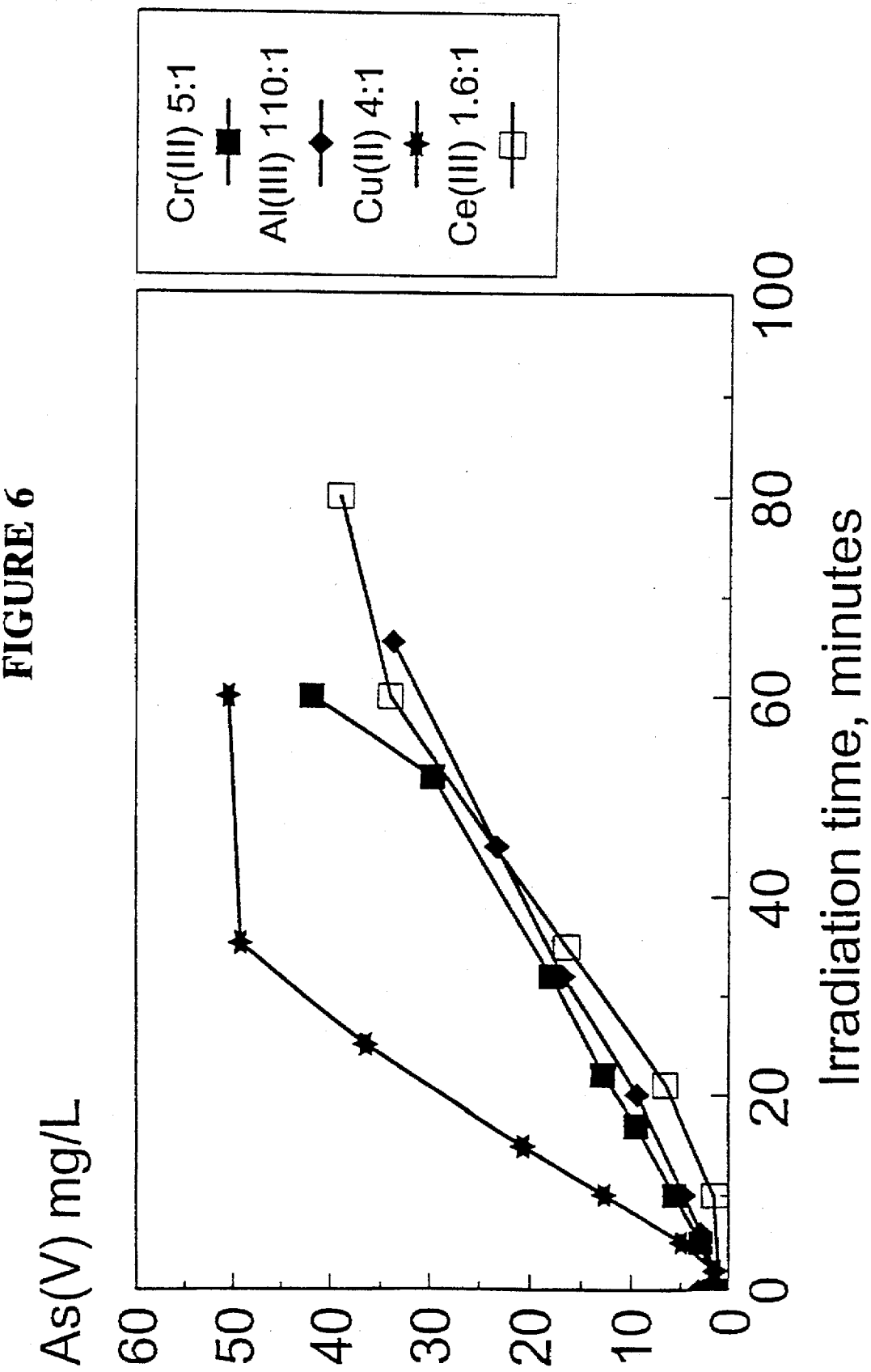
Figure 7:
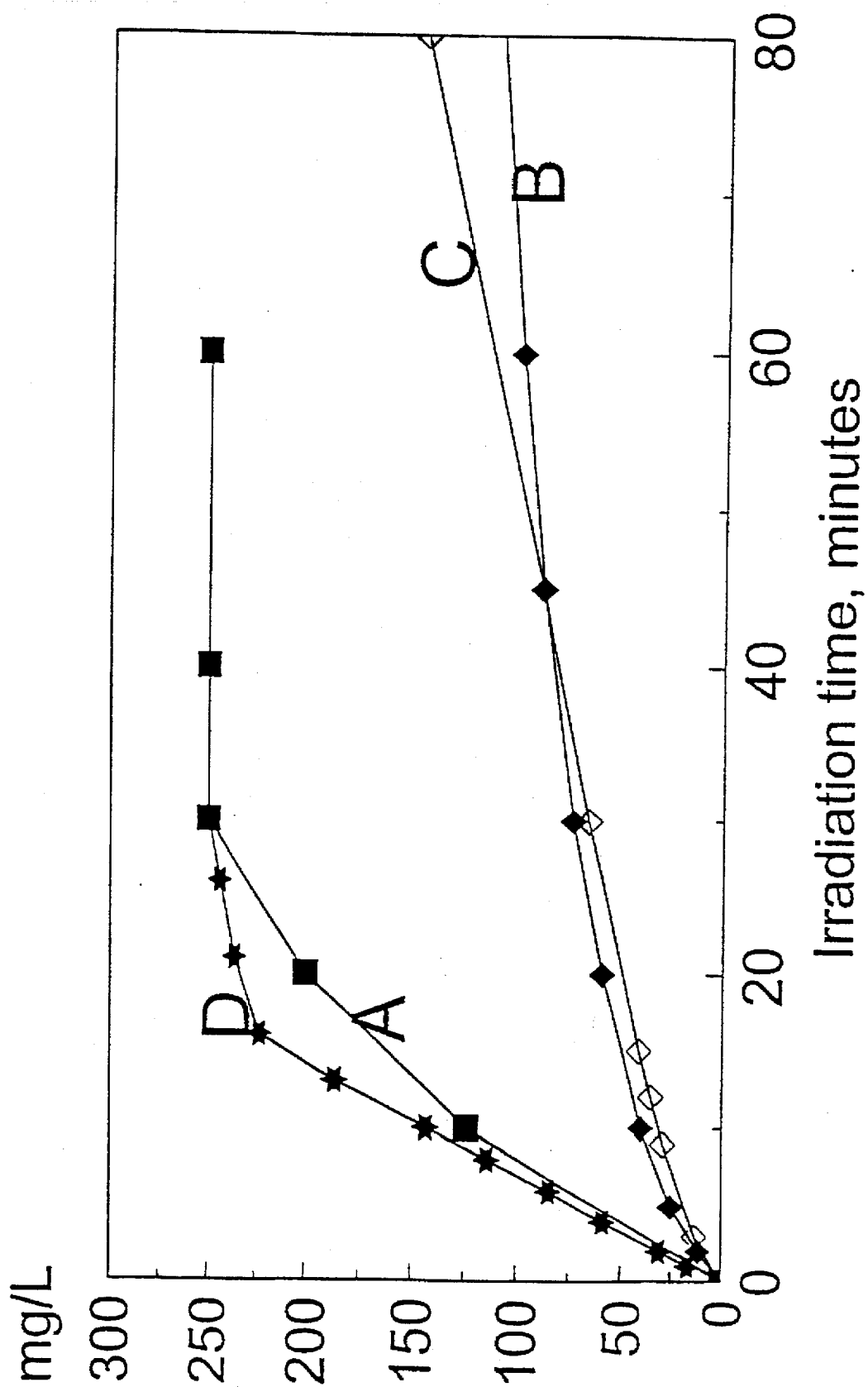

(b) a solution of pH 1 with chloride as anion;

(c) a solution of pH 3 with a sulphate/chloride anion mixture;

for the reactions of Example 4;

FIG. 5 depicts the concentrations of arsenic(V) and iron (II) as a function of solar irradiation time. Initial conditions: As(III) 250 mg/L, Fe(II) 370 mg/L, pH 1, chloride medium, when the solution is exposed to sunlight for the reaction of Example 5;

FIG. 6 depicts the concentrations of dissolved arsenic(V) as a function of irradiation time for different photoabsorbers. Initial conditions: As(III) 50 gm/L, mole ratio of Cu(II)/As (III)=4/1; pH 1, chloride medium, 254 nm UV irradiation, air sparging, for the reactions of Example 6;

FIG. 7 depicts the concentration of arsenic(V) as a function of UV irradiation time using a high pressure mercury lamp. Initial conditions: A (Fe/As 2/1, pH 2), B (Fe/As 1/2, pH 2), C (Fe/As 2/1, pH 3), D (Fe/As 4/1, pH 1). Initial As(III) concentration ~250 mg/L in all cases, as set forth in Example 7.

Figure 8:
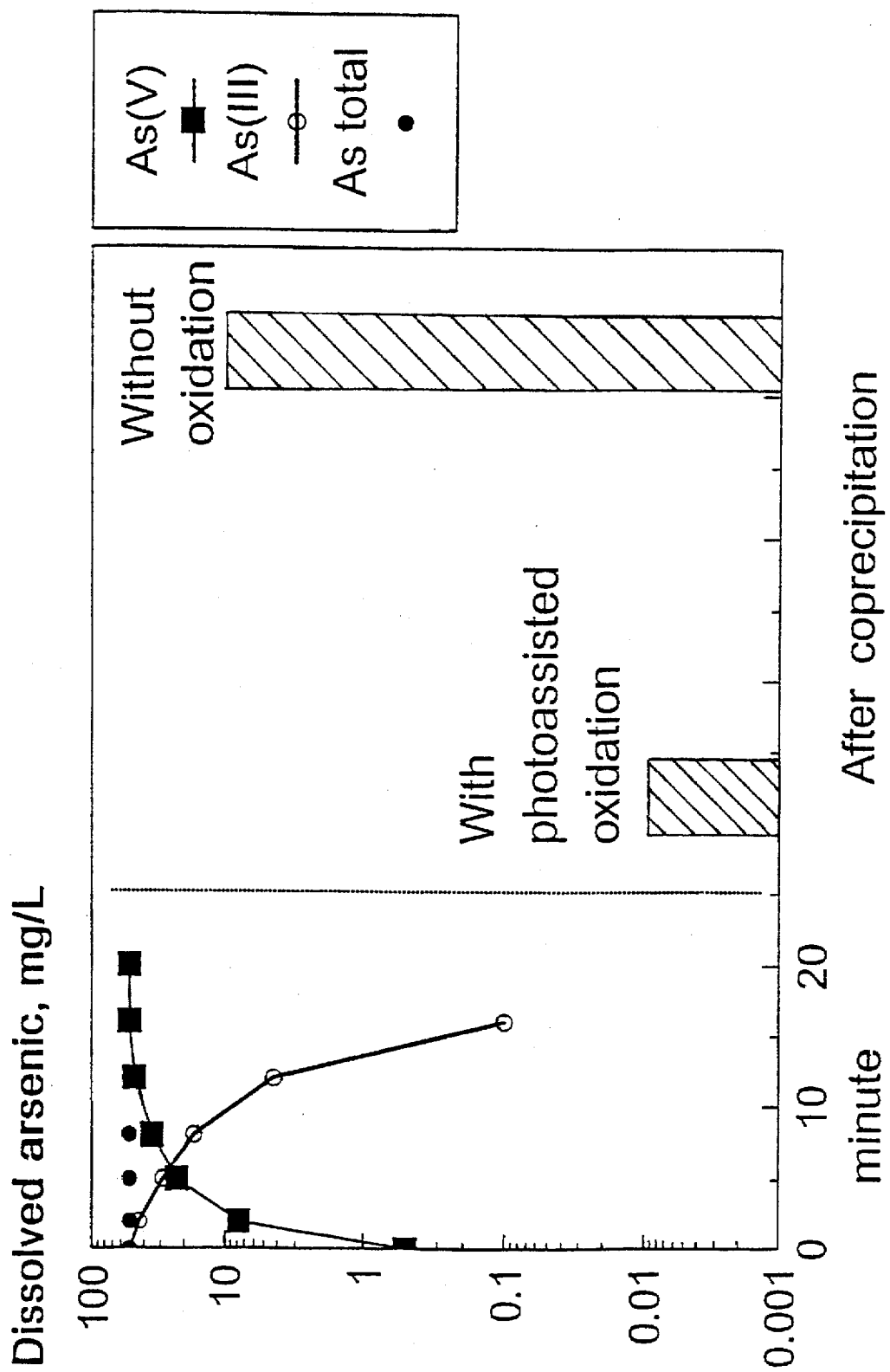

FIG. 8 depicts the photoassisted oxidation of 51.5 mg/L of dissolved arsenic(III) in the presence of 72.2 mg/L of iron(II) in sulphate medium (aerated) using 254 nm lamp, followed by the addition of extra iron and lime to remove the arsenic(V) from solution, being an iron co-precipitation process, for the reaction of Example 8.

Figure 9:
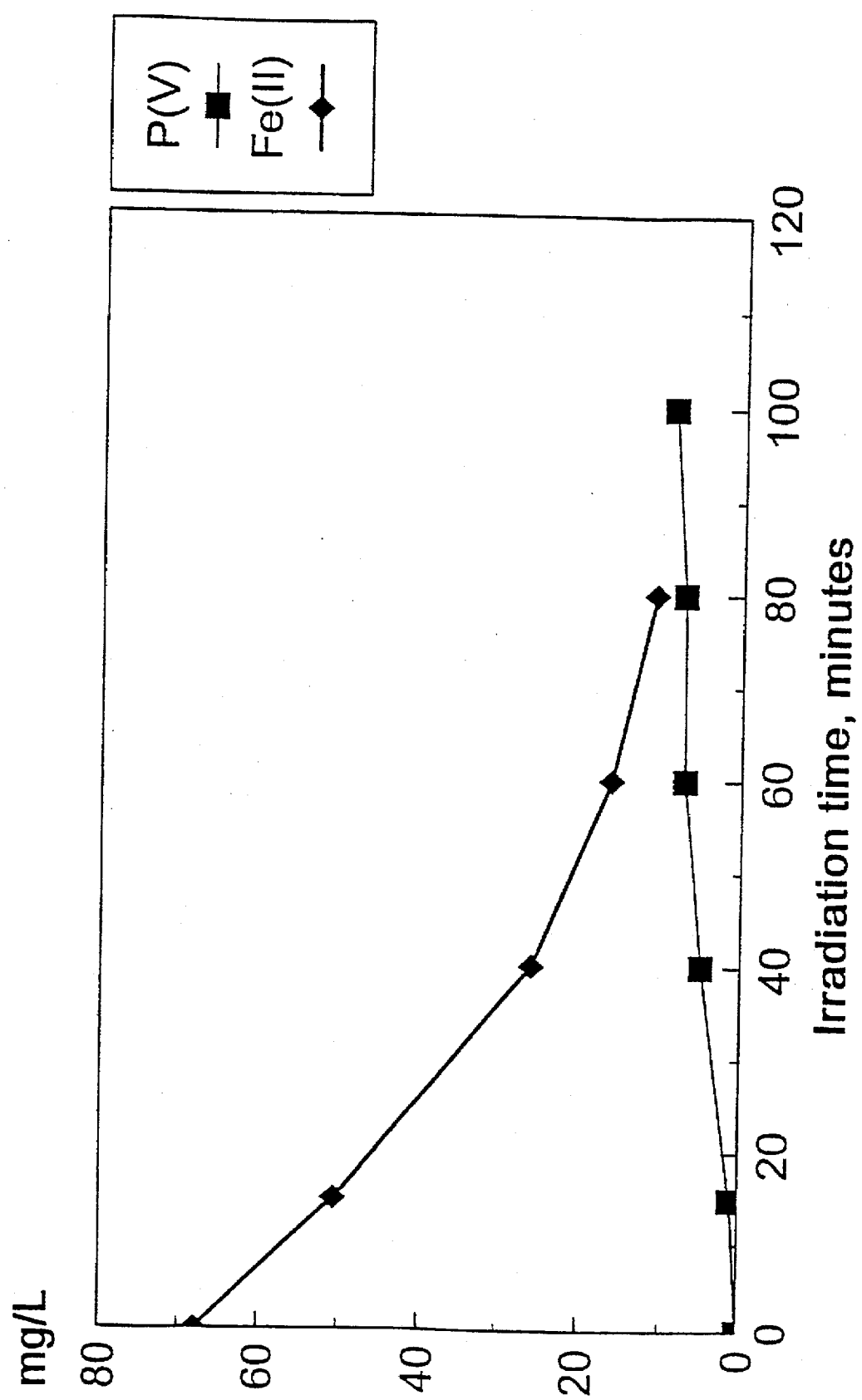

FIG. 9 depicts the concentrations of iron(II) and phosphorus(V) as a function of time when a solution of 74 mg/L Fe(II) and 20.5 mg/L (P(III) was aerated and irradiated with 254 nm UV light; chloride medium, pH 1, for the reaction of Examples 9 and 10;

MODES FOR CARRYING OUT THE INVENTION

EXAMPLES

In the following examples, the following variables were investigated in the evaluation of the photoassisted oxidation of As(III) to As(V), of Fe(II) to Fe(III), of P(III) to P(V).

Source of radiant energy.

For As(III), Fe(II) and P(III) and any artificial source of radiant energy in the UV region of the electromagnetic spectrum can be used, provided that the radiation is absorbed by the photoabsorber (or photoactive substance) present. Low and high pressure mercury arc lamps were used. In the second aspect of the invention where visible light can also be used, blacklight blue, visible fluorescent tubes and sunlight were also investigated.

Low pressure Hg arc lamps emit more than 90% of their radiant energy at a fine 254 nm line. Light of this wavelength is strongly absorbed by aqueous ferrous ions and ferric ions. It was noted that commercial applications for water disinfection and UV oxidation of dissolved organics use similar low pressure lamps because they are the most efficient at converting electrical to radiant energy (up to 50% conversion efficiency).

Source of oxidant.

For the examples below, oxygen is the oxidant during the photoassisted oxidation process. Oxygen was supplied at 0.2 atmosphere partial pressure by aerating the reaction mixture. Higher partial pressures were achieved by varying the oxygen/nitrogen ratio in the oxygen-nitrogen gas mixture at 1 atmosphere.

It was noted that where the source chosen emitted light at a wavelength at about or below 190 nm, ozone was generated from the dissolved oxygen. This did not occur in the examples below. (Ozone is a powerful oxidant and its reaction with arsenite is well established).

Choice of photoabsorber.

It was noted that aqueous arsenite species in solutions did not absorb light above 200 nm, hence a photoabsorber was required to absorb the photon's energy. The use of iron and other metal species as a photoabsorber and accelerator for the oxidation reaction was investigated.

Iron was added to the aerated solution as iron(II) -or iron(III)-chloride, -sulphate or -perchlorate for experiments with pH<3. Above pH 3, iron(III)-species were present mainly as hydrous iron oxide compounds. The rate of arsenic oxidation was influenced by the initial iron to As(III) ratio may also be used as a photoabsorber.

pH.

The reaction mixture pH has a significant effect on the reaction rate and, as indicated above, on the speciation of the photoabsorber. Fe(II) species are stable at pH less than about 3 in the presence of dissolved oxygen.

When the low pressure mercury lamp (254 nm) was used for irradiation and dissolved Fe(II) as a photoabsorber, the rate of reaction was increased with a decrease in solution pH.

Temperature.

When Fe(II) was used as the photoabsorber, the reaction rate was increased with a decrease in the solution temperature mainly because of the increase in the value of saturation dissolved oxygen concentration with a decrease in solution temperature.

Light Intensity.

The reaction rates were dependent on the photon flux when other factors such as dissolved oxygen were not limiting. No reactions of significant rate were observed in the absence of irradiation.

EXPERIMENTAL EXAMPLES

Photochemical Oxidation of Dissolved Arsenic(III)

Example 1

Figure 1:
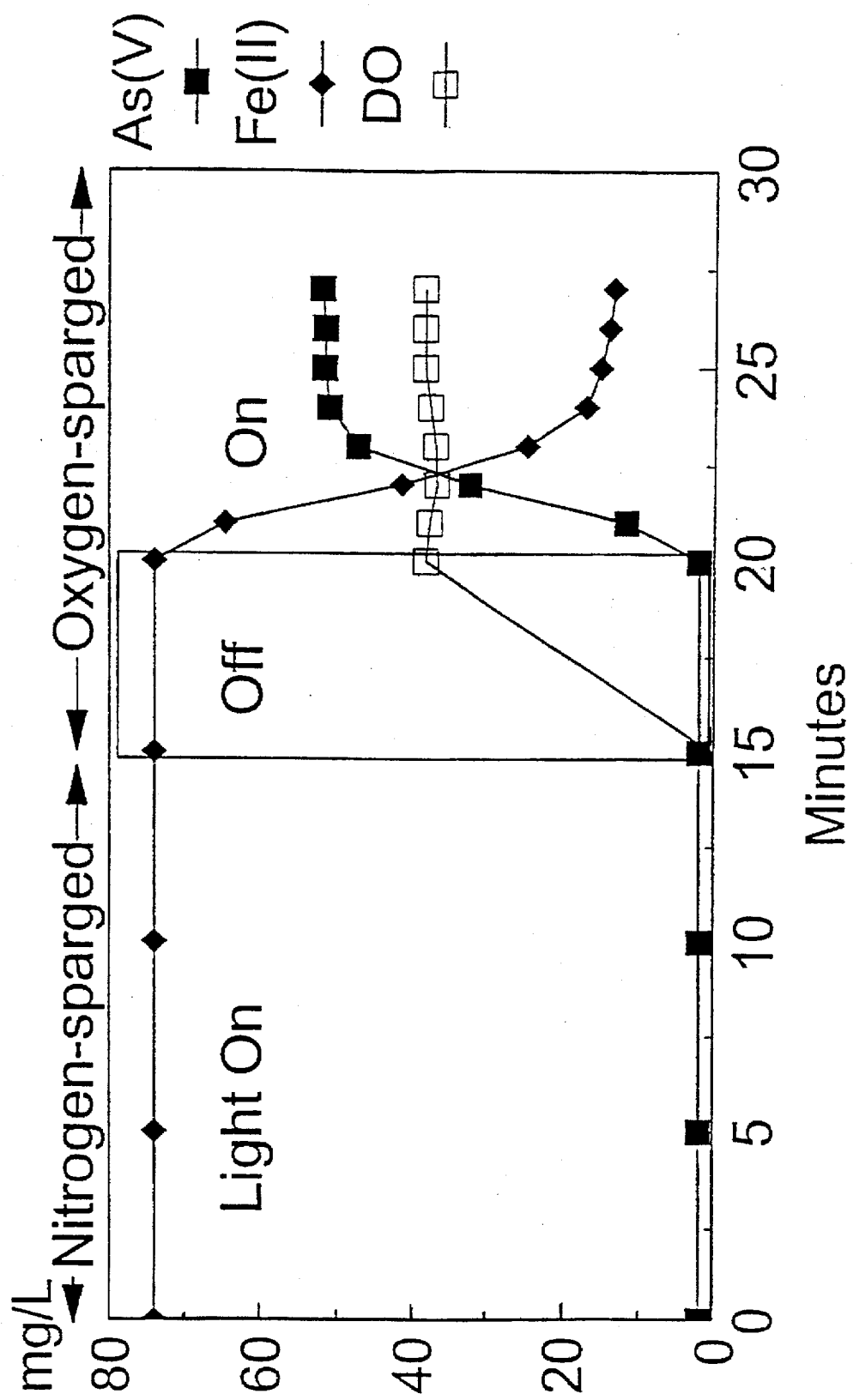
FIG. 1 depicts the changes in the concentrations of arsenic(V), iron(II) and dissolved oxygen(DO) as a function of time when a low-pressure mercury lamp (254 nm) was turned on, off and on again while the solution was deoxygenated and re-oxygenated. Initial concentrations: As(III) 50 mg/L, Fe(II) 74 mg/L, pH 1, chloride medium, for the reaction of Example 1.

A reaction mixture (575 ml) containing 74 mg/L Fe(II) as chloride and 50 mg/L As(III) was prepared as follows: the Fe(II) stock solution was obtained by dissolving iron metal powder in HCl solution, the arsenious acid (As(III)) stock solution was obtained by dissolving arsenic trioxide in heated, filtered, demineralised water. The pH of the reaction mixture was adjusted to 1 with the addition of HCl. The reaction mixture was deoxygenated by bubbing nitrogen and irradiated with light from a 15W Low Pressure Hg lamp (LP Hg lamp). As indicated in FIG. 1, where changes in concentrations of As(V) and Fe(II) are shown as a function of irradiation time, no oxidation of As(III) was observed at this stage.

The lamp was then turned off and the solution was re-oxygenated by oxygen-sparging. As indicated in FIG. 1, again, no oxidation of iron or arsenic was observed.

After the lamp was switched back on, complete oxidation or As(III) to As(V) was achieved in five minutes. In those five minutes, 80% of the initial Fe(II) was also oxidised to Fe(III). This indicates that both light and oxygen were needed when Fe(II) was used as the photoabsorber.

Actinometry determination using potassium ferrioxalate showed that 2 Watts of 254 nm radiation produced by the 15W LD Hg lamp was absorbed by the solution. Total concentrations of Fe, As and other elements were determined using ICP-AES spectroscopy. For low (ppb) concentrations of total As and As(III), atomic absorption spectroscopy with hydride generation was used. For mg/L levels a of as (V), the molybdenum blue spectrophotometric method was used (Johnson D and Pilson M. Anal. Chim. Acta, 58 (1972), 289–299); Fc(II) was determined using a colorimetry method described by Stockey (Anal Chem 42 (1970), 779–781).

Example 2

Figure 2:
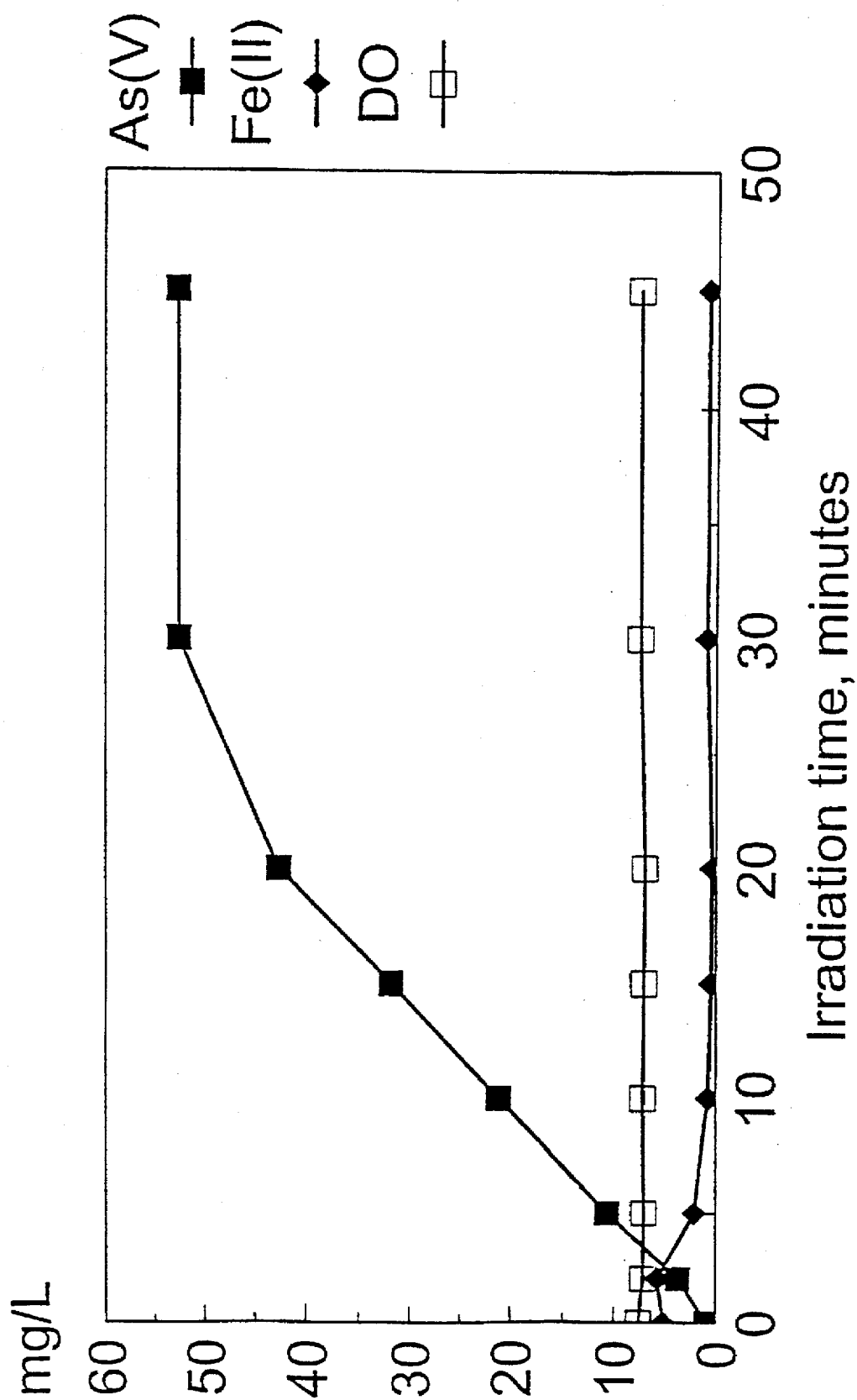
FIG. 2 depicts the concentrations of dissolved arsenic(V), iron(II) and oxygen(DO) as a function of irradiation time. Initial conditions of the aerated solution: As(III) 52.7 mg/L, Fe(III) 74 mg/L, pH 1, chloride medium, for the reaction of Example 2.

A second solution (575 ml) containing 74 mg/L Fe(III) as chloride (ferric chloride) and 50 mg/L As(III) of pH 1 was aerated (with air). When this was irradiated with UV light (254 nm), as above, complete oxidation of As(III) was achieved in 30 minutes (FIG. 2). No significant reaction of Fe(III) to Fe(II) was observed, indicating that oxygen, not iron, was the oxidant.

Example 3

Figure 3:
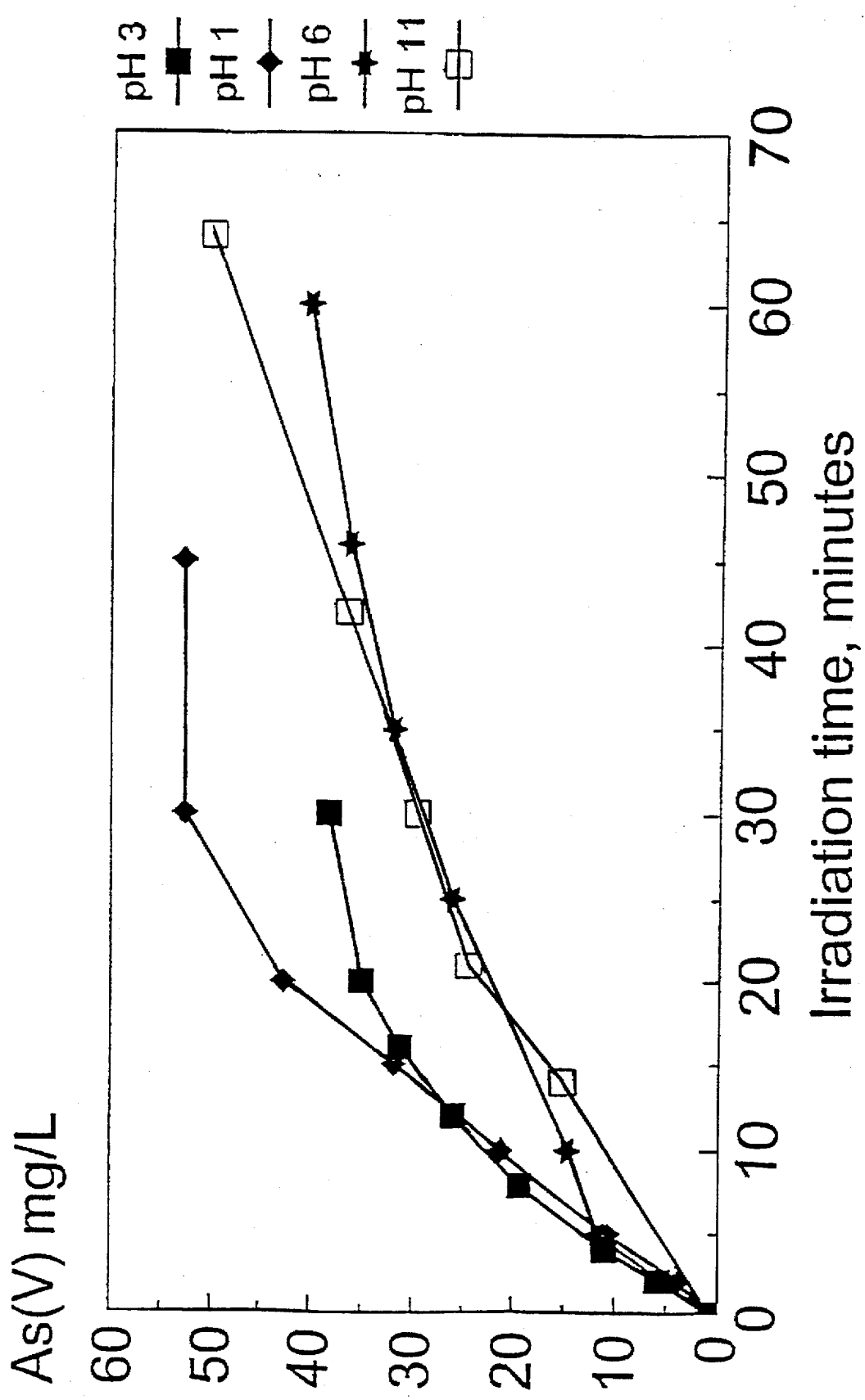
FIG. 3 depicts the concentrations of dissolved arsenic(V) as a function of time for different solution pHs. Initial conditions of the aerated solution: As(III) 52.7 mg/L, Fe(III) 74 mg/L, sulphate medium, for the reactions of Example 3.

Four reaction mixture, each (575 ml) containing 74 mg/L Fe(III) as sulphate (ferric sulphate) and 50 mg/L As(III), were prepared at several pH values (pH 1, 3, 6 and 11) and aerated with air. When the solution was above pH 5, carbon dioxide-free air was used in order to achieve constant pH readings. The initial dissolved As(III) in all the reaction mixtures was oxidised to As(V) only after they were irradiated with the 15W LP Hg lamp (FIG. 3). This indicates that the reaction proceeds in the presence of sulphate (chloride was used in previous examples) and in alkaline as well as in neutral and acid conditions.

Example 4

Two reaction mixtures were prepared with 5 mg/L As(III) and 74 mg/L Fe(II). The first mixture was of pH 2 with sulphate as the anion. The concentrations of Fe(II), As(III) and H$^+$ in this solution would be similar to those found in some acid mine drainage effluents arising from heaps of mining wastes containing arsenopyrite.

The second mixture was of pH 1 with chloride as the anion. Both mixtures were irradiated using the low pressure mercury arc lamp as above.

Figure 4:
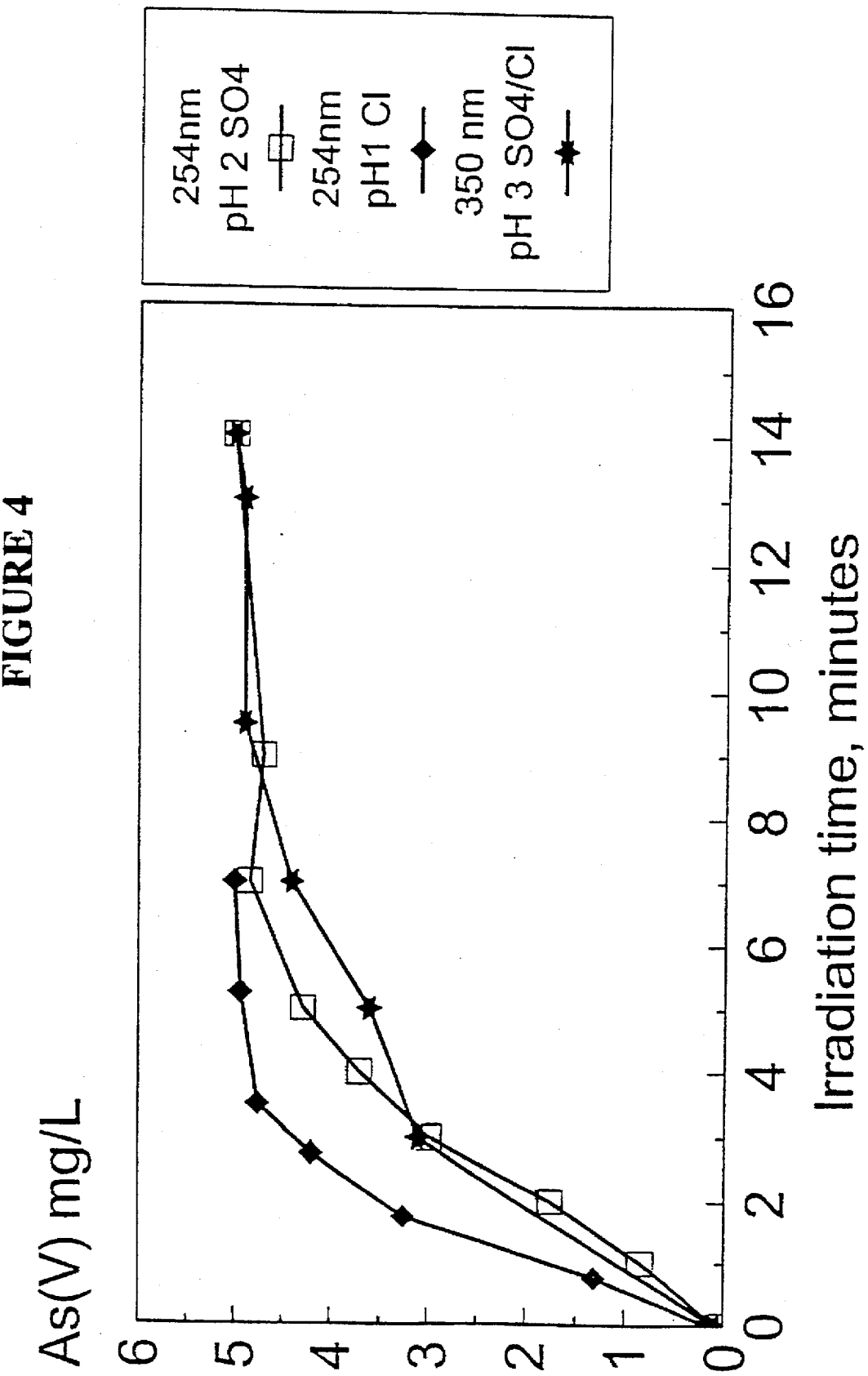
FIG. 4 depicts the concentrations of arsenic(V) as a function of time when aerated solutions containing low concentrations of AS(III) were irradiated with UV light (254 nm or 350 nm). Initial concentrations: As(III) 5 mg/L, Fe(II) 74 mg/L, for (a) a solution of pH 2 with sulphate as anion.

On irradiation, complete oxidation of the arsenic(III) initially present in the reaction mixtures was achieved in less than 10 minutes (FIG. 4). This indicates that low concentrations of As(III) can be completely oxidised in short time. In contrast, it is known that the oxidation rate of As(III) using conventional oxidants, such as hydrogen peroxide, is dependent upon the As(III) concentration. Hence they are slow to oxidise the final fraction of As(III). Because the photochemical method is effective at oxidising low concentrations of arsenic(III), complete oxidation of larger initial concentrations of As(III) an be achieved in reasonable time.

Furthermore, results from optimisation/screening experiments show that the photoassisted reactions favour the oxidation of arsenic(III) in preference to reductants which are usually present in acid drainage waters such as ferrous species. These species, together with partially oxidised sulphur species, represent an extra chlorine- or peroxide-demand in conventional oxidation processes.

A third reaction mixture (750 ml), containing 74 mg/L Fe(III), a 1/1 sulphate to chloride anion ratio, and of pH 3, was irradiated with light from a 20W blacklight blue (BLB) fluorescent tube. Actinometry determination using ferrioxalate showed that the solution absorbed 2.9W of light assuming the band of wavelengths are evenly distributed around 350 nm. Complete oxidation of the arsenic(III) initially present in the reaction mixtures was achieved in 10 minutes.

As blacklight blue tubes emit a near ultraviolet spectrum similar to sunlight, laboratory experiments with this lamp were performed for the simulation of experiments involving solar irradiation in the field.

Photochemical oxidation of As(III) using sunlight

Example 5

A liter of reaction mixture containing 370 mg/L Fe(II) and 250 mg/L As(III) in pH 1.5 HCl was aerated and circulated through a white tray of 20×20 cm. The experiment was conducted in Sydney, Australia, at noon, on 16 Feb. 1994. Complete oxidation of the arsenite was achieved in 100 minutes (FIG. 5).

Photoabsorbers other than iron

Example 6

Copper can also be used as a photoabsorber FIG. 6 shows the progress of oxidation of arsenite (50 mg/L) where Cu(II) was used as the photoabsorber in place of iron. In the absence of irradiation copper did not oxidise arsenite.

The Cu 4, the pH was 1 and chloride was the accompanying anion. A low pressure mercury lamp was used. Metals such as divalent Mn, Ni and Zn did not absorb ultraviolet light at 254 nm.

Example 7

A high pressure mercury lamp was used as the source of light for the experiments shown in FIG. 7. Four solutions, each of 200 mL, with different Fe(II)/As(III) ratios and pH as shown in the table below (chloride medium) were irradiated. Different rates of oxidation were observed. Run D gave the fastest rate ie. the initial As(III) concentration of 250 mg/L was completely oxidised in less than 30 minutes.

|  | A | B | C | D |
|---|---|---|---|---|
| Fe/As ratio | 2/1 | 1/2 | 2/1 | 4/1 |
| pH | 2 | 2 | 3 | 1 |

Interfering Substances

As(III) oxidation rate is reduced if the optical density of the solution is increased by the presence of other species which absorb ultraviolet light eg. dissolved conjugated organic compounds or excessive iron(III) concentrations. Screening tests indicated that the reaction rate is not significantly reduced by the presence of soil organics such as fulvic acid (8 mg/L). Sulphur(IV) as sulphite also did not significantly effect the rate. Heavy metals such as nickel, chromium, zinc, manganese and copper were not found to reduce the rate. The reaction is faster if chlorine or perchlorate electrolytic is used in place of sulphate. Carbonate introduced by aerating alkaline solutions has no observable effect on the reaction rate. Calcium and magnesium do not interfere with the reaction so wastes previously stored as calcium arsenite may be successfully treated.

Photochemical Oxidation and Removal of Dissolved Arsenic(III)

Example 8

A solution (575 ml) containing 30 mg/L As(III) and 74 mg/L Fe(II) as sulphate (pH 2) was aerated (with air) and irradiated with UV light (254 nm). The oxidation of As(III) to As(V) was completed in 15 minutes (FIG. 8).

After the photoassisted oxidation process was completed, extra iron was added, as Fe(III)-sulphate (alternatively, Fc(II) chloride or used pickle solution from the steel industry can also be used because at pHs 3.5 Fe(II) is oxidised to Fc(III) by dissolved oxygen in aerated solution) to give an Fe-to-As mole of about 7, and lime was added to give a final pH 5 (the optimum pH for arsenic removal using iron co-precipitation). The residual dissolved (total) arsenic concentration was found to be 0.008 mg/L (the World Health Organisation guideline for drinking water for arsenic is 0.050 mg/L).

For comparison, when the photooxidation process was not included, using the same iron co-precipitation process, the total residual arsenic concentration was found to be 8.5 mg/L ie. a 1000-fold factor greater than when the As(III) was first photochemically oxidised.

The oxidation and removal process can also be applied to the treatment of pyrometallurgical flue dusts (eg. from the roasting of arsenoopyritic ores) which can contain more than 50% arsenic trioxide. It was proposed to extract the flue dust using hydrochloride acid (HCl) and to add iron(II) solution before irradiation or, alternatively, using pickle solution from the steel industry which is usually rich in HCl and ferrous ions.

The flue dust extract, which was obtained by leaching the flue dust with 0.1M HCl overnight, contained 600 mg/L As(III) and iron was added to give a concentration of 70 mg/L Pe(II). Using UV irradiation from the LP Hg lamp above and aerated with air, the oxidation step was completed in less than 60 minutes.

After the addition of extra iron to give a Fe/As mole ratio of 7/1 and neutralisation with lime to pH 7, the concentration of dissolved arsenic in the water was reduced from 600 mg/L in the flue dust extract to 0.045 mg/L. For comparison, when the oxidation step was not included, the residual dissolved arsenic in the treated water was 0.450 mg/L. Co-precipitation pH of 7 was used, instead of the optimum for arsenate removal (pH 5), because pH 5 would have been too low for the removal of heavy metals which are usually present in flue dust.

Photochemical Oxidation of Iron(II) at pH<3

Example 9

It is known that, in the absence of UV irradiation, the oxidation rate of Fe(II) to Fe(III) by oxygen at pH less than about 3 is very slow. As already mentioned above, and shown in FIGS. 1 and 5, when Fe(II) was used as the photoabsorber for the photoassisted oxidation of As(III), it was also oxidised to Fe(III).

Further experiments showed that a non-metal can be used to increase the rate of oxidation of Fe(II) to Fe(III). As depicted in FIG. 9, the presence of dissolved phosphorus(III) which was added as $H_3PO_2$, increased the rate of oxidation of Fe(II) when irradiated using a low pressure mercury lamp.

Photochemical Oxidation of P(III)

Example 10

It was observed that during the experiment whose result is shown in FIG. 9, P(III) and was oxidised in the same manner as As(III) ie. P(III) to P(V).

The following results were observed:

| Photoassisted oxidation of P(III) to P(V) | | |
|---|---|---|
| | Before irradiation | After 100 minutes irradiation |
| P(III) | 20.5 | 11.66 |
| P(V) | 0 | 8.84 |

Proposed Use of Methods and Processes

First and second aspect of the invention: Oxidation and removal of dissolved arsenic(III)

As discussed above, this aspect of the invention is versatile, in that it can be used to rapidly achieve complete oxidation of arsenic in solutions with either high or low initial arsenic(III) concentrations. Hence, the projected commercial applications of this invention are:

The dissolution and oxidation of arsenic trioxide contained in metallurgical flue dust as an initial process for arsenic recovery or for the eventual disposal as iron (III)-arsenals compounds. Arsenic trioxide and other forms of arsenic(III) are frequently a waste-product of the mining and extraction of metals such as copper, gold, lead, nickel and zinc.

The oxidation and removal of dissolved arsenic(III) from:
leachates arising from heaps of coal fly ash
acid drainage from piles of pyritic material arising from mining operations
ground water or geothermal/spring waters.

Third aspect: Oxidation of iron(II) in acid solution

Iron(III) in acid solution is commonly used as an oxidant for use in hydrometallurgical processes, for example the oxidative leaching of uranium ores and heap leaching of ores. Currently, oxidants such as peroxide- or chlorine-compounds are used for the re-oxidation of iron(II) in the leaching circuit. The photoassisted oxidation of iron)II) by dissolved oxygen can be used as an alternative to these oxidants.

Fourth aspects: Oxidation of phosphorus(III)

Dissolved iron is a common impurity in hydrometallurgical process liquors. If it is present as Fe(II) in acid solution, the addition of P(III), say as phosphorous acid of its salt, and irradiation using UV lamps or sunlight can precipitate out the iron impurity as ferric phosphate.

We claim:

1. A method for the oxidation of As(III) in solution comprising the steps of:
   (a) supplying to the solution oxygen, and a photoabsorber which is capable of increasing the rate of As(III) oxidation when exposed to UV radiation; and
   (b) irradiating the resultant solution from (a) with UV radiation.

2. A method as claimed in claim 1, wherein the photoabsorber is a metal containing dissolved or solid species.

3. A method as claimed in claim 2, wherein the photoabsorber is a dissolved cationic species.

4. A method as claimed in claim 1, wherein the photoabsorber is selected from one or more selected from the group consisting of Fe(II), Fe(III) and Cu(II).

5. A method as claimed in claim 1, wherein the oxygen is supplied to the solution to the form of air or as pure oxygen.

6. A method as claimed in claim 1 wherein the oxygen is supplied to the solution at a pressure of or greater than ambient, or at a partial pressure of or greater than 0.2 atmospheres.

7. A method or process as claimed in claim 1, wherein in steps (a) and (b) the pH is less than about 4.

8. A method or process as claimed in claim 1, wherein the radiation includes specific radiant energy at wavelength(s) of about 254 nm and/or 190 nm.

9. A method or process as claimed in claim 1, wherein the electromagnetic radiation is, or the UV radiation is, from sunlight.

10. A method for the oxidation of phosphorus(III) in solution comprising the steps of:
    (a) supplying to the solution oxygen, and a photoabsorber that increases the rate of said oxidation when exposed to UV radiation; and
    (b) irradiating the resulting solution from (a) with UV radiation.

11. A process for removal of As(III) from solution comprising the steps of:
    (a) supplying to the solution an oxidant, and a photoabsorber that both increases the rate of As(III) oxidation when exposed to electromagnetic radiation and precipitates/co-precipitates with subsequently oxidized As(III);

(b) irradiating the resulting solution from (a) with electromagnetic radiation; and (c) allowing precipitation/co precipitation of the subsequently oxidized As(III) and the photoabsorber, if necessary, by adjusting the pH of the solution from (b) to cause said precipitation/co-precipitation.

12. A process as claimed in claim 11, wherein the oxidant is oxygen and is supplied to the solution in the form of pure oxygen or air.

13. A process as claimed in claim 12, wherein the oxygen is supplied to the solution at a pressure of or greater than ambient, or at a partial pressure of or greater than 0.2 atmospheres.

14. A process as claimed in claim 11, wherein, in step (c) the pH is adjusted to be greater than about 3.

15. A process as claimed in claim 8, wherein the photoabsorber is one or both of Fc(II), or Fe(III).

16. A process as claimed in claim 8, wherein, in step (c) the pH is increased by adding lime, sodium hydroxide or other base to the solution.

17. A method for oxidising Fe(II) to Fe(III) in a solution having acid pH comprising the steps of:

(a) supplying to the solution an oxidant, and As(III) or P(III); and (b) irradiating the resulting solution from (a) with UV radiation.

18. A method as claimed in claim 17, wherein the pH of the solution is about 3.5 or less.

19. A method as claimed in claim 17, wherein the substance is P(III) and irradiating of the resulting solution from (a) with UV radiation causes P(III) to be oxidised to P(V) such that Fc(III) formed in the method precipitates as ferric phosphate.

20. A method as claimed in claim 17, wherein the oxidant is oxygen, and is supplied in the form of other pure oxygen or air.

21. A methods as claimed in claim 20, wherein the oxygen is supplied to the solution at a pressure of or greater than ambient, or at a partial pressure of or greater than 0.2 atmospheres.

* * * * *